United States Patent Office 3,419,247
Patented Dec. 31, 1968

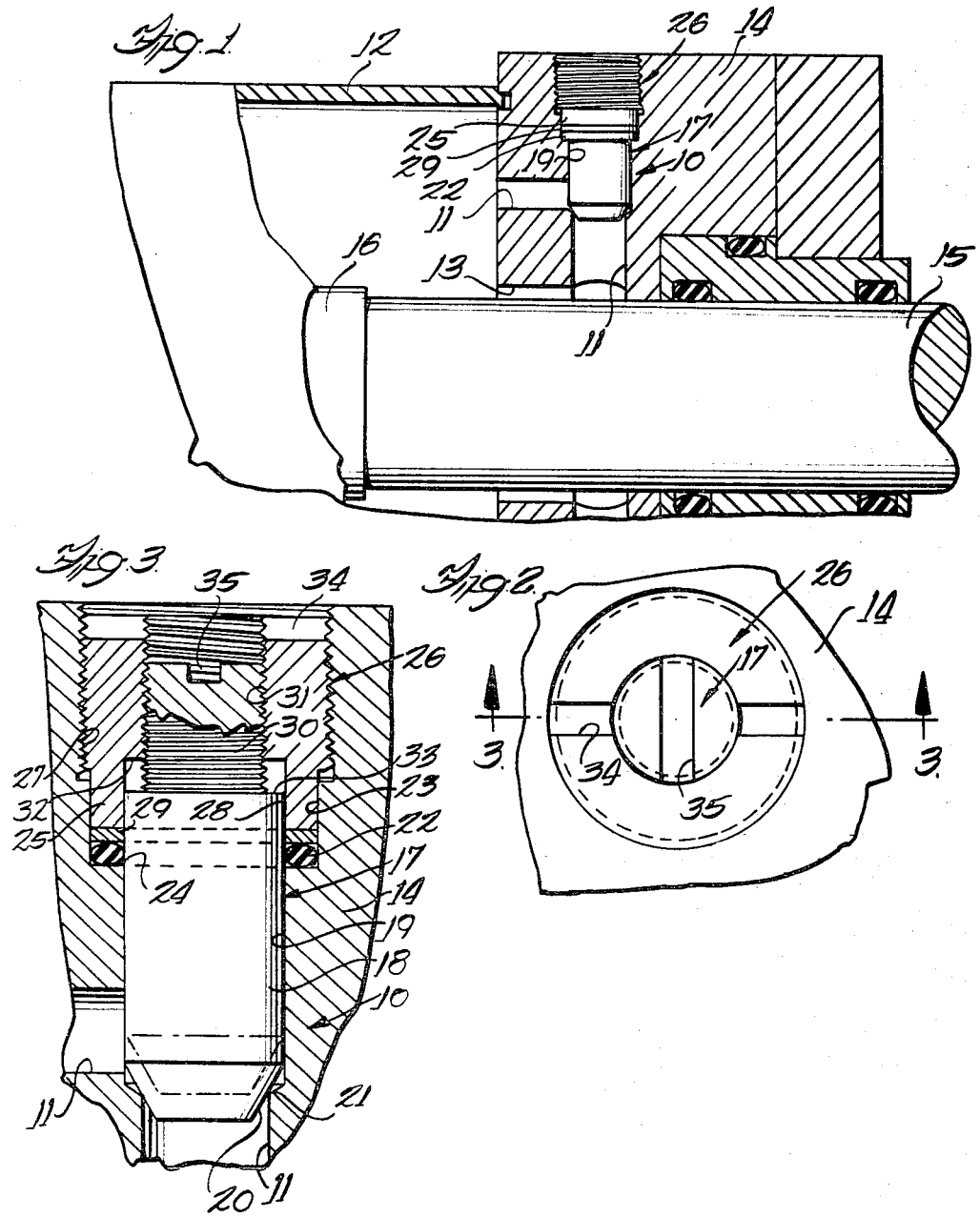

1

3,419,247
VALVE FOR FLUID PRESSURE DEVICE
Joseph I. Bosi, Rockford, Ill., assignor to Hydro-Line Manufacturing Co.
Filed Aug. 26, 1964, Ser. No. 392,259
6 Claims. (Cl. 251—214)

This invention relates generally to valves for fluid pressure devices such as piston and cylinder actuators and, more particularly, to a so-called needle valve having an elongated cylindrical valve element telescoping within a bore in a valve body and movable axially through a threaded adjustment toward and away from a circular seat to vary the spacing and thereby the flow of fluid between the element and the seat. In such valves, a resilient sealing ring ordinarily is interposed between the element and the body to seal against fluid flow between the two.

The primary object of the present invention is to provide a novel valve construction of the above character in which the sealing ring engages only smooth surfaces under easily adjusted pressures and the valve element is adjusted easily and retained in adjusted position without danger of separation from the valve body.

Another object is to confine the sealing ring within smooth surfaces and still provide adjustment of the pressure on the sealing surfaces of the ring.

A further object is to confine the valve element by a novel support member which not only provides a stop to limit adjusting movement of the element but also is adjustable itself to vary the sealing ring pressure.

A more detailed object is to thread the valve element into a separate support member which is constructed in a novel manner to insure that the sealing ring is confined by smooth surfaces.

Other objects and advantages of the invention will become apparent from the following detailed description taken in connection with the accompanying drawings in which:

FIGURE 1 is a fragmentary side elevational view of a piston and cylinder device with a valve embodying the novel features of the present invention, some of the parts being broken away and shown in vertical section;

FIG. 2 is a fragmentary plan view of the valve; and

FIG. 3 is a fragmentary sectional view taken along the line 3—3 of FIG. 2.

In the drawings, the present invention is shown for purposes of illustration embodied in a needle valve 10 for controlling the flow of fluid under pressure through a passageway 11 between the interior of a cylinder tube 12 and a bore 13 in a cap or head 14 which is clamped as by the rods (not shown) against one end of the tube. Fluid under pressure is introduced to opposite ends of the tube to shift a piston (not shown) in opposite directions, such motion being transmitted through a rod 15 to any part which may be connected to the rod on the exterior of the cylinder. A cushion sleeve 16 on the rod enters the bore in the head near one end of the stroke of the piston leaving only the reduced area of the passageway as a route for the exit of fluid from the tube and thereby providing a cushioning action to reduce the speed of the piston.

The needle valve comprises generally an elongated cylindrical element 17 having one end portion 18 which is adjustable in a bore 19 in the cylinder head 14 to shift the adjacent end 20 of the element toward and away from a circular seat 21 concentric with the bore. The seat is of slightly smaller diameter than the bore and the end of the element tapers so that, as the element is shifted axially, the spacing between the seat and the tapering end varies with a corresponding change in the volume of fluid passing through the valve. Herein, the passageway 11 is formed

2 as perpendicular holes one of which is aligned with and slightly smaller than the valve element bore 19 and terminates in the seat. Interposed between the valve element and the head which acts as the valve body is a seal 22 preventing the escape of pressure fluid from the passageway.

In accordance with the present invention, the seal 22 is a ring confined within smooth surfaces but is subjected to a variable compression to adjust the pressure between the ring and the surfaces of the head 14 and the element 17 engaged by the ring. For these purposes, a counterbore with a smooth cylindrical wall 23 is formed in the head in axial alignment with the bore 19 for the element but spaced from the valve seat. The end portion 18 of the element within its bore is of smooth cylindrical contour and projects beyond the end of that bore to cooperate with the counterbore wall to define a cylindrical recess. The seal ring is seated in this recess and against the smooth bottom 24 of the counterbore.

To provide an adjustable pressure on the seal ring 22, one end portion 25 of a cylindrical plug 26 projects into the cylindrical ring recess and the other end portion of the plug is threaded into a second counterbore 27 in the head 14. The exterior of the inner end portion of the plug is smooth and telescopes closely within the first counterbore wall 23 and the interior wall 28 of that end portion is of smooth cylindrical contour of the same size and in axial alignment with the valve element bore 19 so as to telescope over the smooth peripheral portion 18 of the element projecting beyond the bore.

The axial force exerted on the seal ring 22 is adjusted by turning the plug 26 within the second counterbore 27 to shift the inner end 25 of the plug toward and away from the bottom of the first counterbore 23. To avoid contact and relative sliding between the ring and the plug, a back-up washer 29 is inserted between the two. This preferably is formed of a rigid material such as a phenolic resin and is flat with one side facing axially and inwardly for engagement with the seal ring and the other side facing outwardly to engage the plug. The seal ring preferably is an O ring of uniform circular cross section.

Axial adjustment of the valve element 17 is obtained by forming mating threads on its outer end portion 30 and on the interior 31 of the outer end portion of the plug 26. To limit outward movement of the element and thereby retain it as a captive part in the assembly, the diameter of these mating threaded parts is made smaller than the diameters of the smooth end portion 18 of the element and the smooth interior wall 28 on the inner end portion of the plug. This results in an interior shoulder 32 on the plug facing axially and inwardly to form a stop engageable with an outwardly facing shoulder 33 on the element. These shoulders are located along their respective axes to provide the desired amount of clearance and axial adjustment of the element after the plug has been turned to provide the desired pressure on the seal ring. Suitable kerfs 34 and 35 are provided on the outer ends of the plug and element to receive tools for turning these parts.

In the assembly of the improved valve 10, the O ring 22 is first seated on the bottom 24 of the first counterbore 23 with the back-up ring 29 on its outer side. Then, after the outer end 30 of the valve element 17 has been threaded into the mating internal threads 31 on the outer end portion of the plug 26, the smooth end portion 18 of the element is telescoped through the sealing and back-up rings and into the bore 19 for the element and the plug is threaded into the second counterbore 27. The plug is turned inwardly to bring its inner end into engagement with the back-up ring and apply an axial pressure to the sealing ring through the medium of the back-up ring, this pressure urging the sealing ring radially and outwardly against the first counterbore wall 23 and inwardly against the smooth exterior 18 of the element as well as axially and inwardly against the bottom 24 of the first counterbore.

After the seal ring pressure has been adjusted, the valve element 17 is turned to its desired position with respect to the seat 21. In addition to preventing fluid leakage, the inward pressure exerted by the sealing ring 22 on the inner end portion 18 of the valve element holds the element against turning and thus against change of its axial position with respect to the seat.

It will be apparent that the sealing ring 22 engages only smooth surfaces. This not only provides a good sealing action at high pressures on the order of 10,000 pounds per square inch, but also avoids wear on the ring during relative turning of the valve element 17. Wear due to friction also is reduced by the back-up ring 29. With the shoulder 32 on the plug 26 to limit outward turning of the element 17, the element is retained in its assembled relation with the other parts and can only be removed with the plug, the abutment of the element with the plug indicating that the outer limit of adjustment of the element has been reached.

I claim:

1. In a fluid pressure device, the combination of a body having a cylindrical internally threaded bore extending inwardly from an exterior surface of the body, a first counterbore aligned axially with and extending inwardly from said bore and providing a smooth cylindrical wall, a second counterbore extending inwardly from and aligned axially with said first counterbore and providing a smooth cylindrical internal wall, means on said body defining a circular valve seat concentric with said second counterbore and spaced from said first counterbore, an elongated cylindrical valve element having one end portion threaded externally and its other end portion of smooth cylindrical external contour telescoping closely and guided within said second counterbore and extending from said valve seat along and axially beyond the remote end of the second counterbore and into said first counterbore, a ring of resilient sealing material seated in the bottom of said first counterbore and telescoping closely with said interior wall of the first counterbore and said smooth other end portion of said element, a hollow cylindrical plug having one end portion threaded into said bore and formed with internal threads receiving said threaded end portion of said element and its other end portion of reduced thickness telescoping closely with said second counterbore wall and said smooth end portion of said valve element, said other end portion of said plug applying an axial force to compress said resilient ring and force the same radially into sealing engagement with said second counterbore wall and said smooth end portion of said valve element, a back-up ring interposed between said sealing ring and said plug to transmit said axial compression force to the sealing ring, and shoulders formed on the interior of said plug and on said element and facing axially to engage each other and limit axial movement of the element away from said seat.

2. In a fluid pressure device, the combination of a body having a fluid passageway, a circular valve seat in said passageway, means on said body defining a cylindrical bore aligned axially with and disposed adjacent said seat, a first counterbore having a smooth cylindrical wall aligned axially with and larger than said bore and spaced from said seat, and a second counterbore having an internally threaded wall aligned axially with and larger than said first counterbore and spaced farther from said seat than said first bore, a sealing ring of resilient material seated in the bottom of said first counterbore with its outer periphery engaging said smooth wall of the counterbore, a back-up ring telescoping within said smooth first counterbore wall and having first and second axially facing sides the first of which engages said sealing ring, a keeper plug of generally cylindrical shape having a first end portion threaded into second counterbore wall and its other end portion of smooth exterior contour telescoping closely within said first counterbore wall and terminating in an axially facing edge engaging said second side of said back-up ring to apply an axial force and compress said sealing ring, means on the interior of said plug defining an internally threaded bore on said first end portion of the plug and a larger smooth cylindrical counterbore axially aligned with and having the same diameter as said bore in said body, said counterbore in said plug terminating in a shoulder facing toward said valve seat, and an elongated valve member having a first end portion of smooth cylindrical contour telescoping within said sealing ring and said bore and cooperating with the sealing ring to prevent the passage of fluid between them and with said seat to provide a valve opening variable in size with movement of the member axially of the bore, said other end portion of said member being threaded into said bore of said plug for axial adjustment toward and away from said seat and terminating in a shoulder facing toward and engageable with said shoulder on the plug to limit movement of the member axially away from the seat.

3. In a fluid pressure device, the combination of a body having a fluid passageway, a circular valve seat in said passageway, means on said body defining a cylindrical bore aligned axially with and disposed adjacent said seat, a first counterbore having a smooth cylindrical wall aligned axially with and larger than said bore and spaced from said seat, and a second counterbore having an internally threaded wall aligned axially with and larger than said first counterbore and spaced farther from said seat than said first bore, a sealing ring of resilient material seated in the bottom of said first counterbore with its outer periphery engaging said smooth wall of the counterbore, a keeper plug of generally cylindrical shape having a first end portion threaded into second counterbore wall and its other end portion of smooth exterior counter telescoping closely within said first counterbore wall and terminating in an edge facing axially toward said sealing ring to apply an axial force to compress the ring, means on the interior of said plug defining an internally threaded bore on said first end portion of the plug and a larger smooth cylindrical counterbore axially aligned with and having the same diameter as said bore in said body, said counterbore in said plug terminating in a shoulder facing toward said valve seat, and an elongated valve member having a first end portion of smooth contour telescoping within said sealing ring and said bore and cooperating with the sealing ring to prevent the passage of fluid between them and with said seat to provide a valve opening variable in size with movement of the member axially of the bore, said other end portion of said member being threaded into said bore of said plug for axial adjustment toward and away from said seat and terminating in a shoulder facing toward and engageable with said shoulder on the plug to limit movement of the member axially away from the seat.

4. In a fluid pressure device, the combination of a body having a cylindrical internally threaded bore extending inwardly from an exterior surface of the body, a first counterbore aligned axially with and extending inwardly from said bore and providing a smooth cylindrical wall, a second counterbore extending inwardly from and aligned axially with said first counterbore and providing a smooth cylindrical internal wall, means on said body defining a circular valve seat concentric with said second counterbore and spaced from said first counterbore, an elongated cylindrical valve element having one end portion threaded externally and its other end portion of smooth cylindrical external contour telescoping closely and guided within said second counterbore and extending from said valve seat along and axially beyond the remote end of the second counterbore and into said first counterbore, a ring of resilient sealing material seated in the bottom of said first counterbore and telescoping closely with said interior wall of the first counterbore and said smooth other end portion of said element, a hollow cylindrical plug having one end portion threaded into said bore and formed with internal threads receiving said threaded end portion of said element and its other end portion telescoping closely with said second counterbore wall and said smooth end portion of said valve element, said other end portion of said plug applying an axial force to compress said resilient ring and force the same radially into sealing engagement with said second counterbore wall and said smooth end portion of said valve element, and a back-up ring interposed between said sealing ring and said plug to transmit said axial compression force to the sealing ring.

5. In a fluid pressure device, the combination of a body having a cylindrical internally threaded bore extending inwardly from an exterior surface of the body, a first counterbore aligned axially with and extending inwardly from said bore and providing a smooth cylindrical wall, a second counterbore extending inwardly from and aligned axially with said first counterbore and providing a smooth cylindrical internal wall, means on said body defining a circular valve seat concentric with said second counterbore and spaced from said first counterbore, an elongated cylindrical valve element having one end portion threaded externally and its other end portion of smooth cylindrical external contour telescoping closely and guided within said second counterbore and extending from said valve seat along and axially beyond the remote end of the second counterbore and into said first counterbore, a ring of resilient sealing material seated in the bottom of said first counterbore and telescoping closely with said interior wall of the first counterbore and said smooth other end portion of said element, and a hollow cylindrical plug having one end portion threaded into said bore and formed with internal threads receiving said threaded end portion of said element and its other end portion telescoping closely with said second counterbore wall and said smooth end portion of said valve element, said other end portion of said plug applying an axial force to compress said resilient ring and force the same radially into sealing engagement with said second counterbore wall and said smooth end portion of said valve element.

6. In a fluid pressure device, the combination of a body having a fluid passageway, a circular valve seat in said passageway, means on said body defining a cylindrical bore aligned axially with and disposed adjacent said seat, a first counterbore having a smooth cylindrical wall aligned axially with and larger than said bore and spaced from said seat, and a second counterbore having an internally threaded wall aligned axially with and larger than said first counterbore and spaced farther from said seat than said first bore, a sealing ring of resilient material seated in the bottom of said first counterbore with its outer periphery engaging said smooth wall of the counterbore, a keeper plug of generally cylindrical shape having a first end portion threaded into second counterbore wall and its other end portion of smooth exterior contour telescoping closely within said first counterbore wall and terminating in an end facing axially toward said sealing ring to apply an axial force to compress the ring, means on the interior of said plug defining an internally threaded bore on said first end portion of the plug and a smooth cylindrical counterbore axially aligned with and having the same diameter as said bore in said body, and an elongated valve member having a first end portion of smooth contour telescoping within said sealing ring and said bore and co-operating with the sealing ring to prevent the passage of fluid between them and with said seat to provide a valve opening variable in size with movement of the member axially of the bore, said other end portion of said member being threaded into said bore of said plug for axial adjustment toward and away from said seat.

References Cited
UNITED STATES PATENTS

| | | | |
|---|---|---|---|
| 2,646,959 | 7/1953 | Carver | 277—112 X |
| 2,980,390 | 4/1961 | Anderson et al. | 251—214 X |
| 3,084,902 | 4/1963 | Hare | 251—214 X |
| 3,247,767 | 4/1966 | Aslan | 91—26 |

WILLIAM F. O'DEA, *Primary Examiner.*

D. R. MATTHEWS, *Assistant Examiner.*

U.S. Cl. X.R.

91—26; 251—122, 285, 312